Nov. 26, 1963  C. L. AVERY  3,112,406
GOVERNOR SYSTEM

Filed Dec. 15, 1960  2 Sheets-Sheet 2

INVENTOR
Clarence L. Avery
Wolfe, Hubbard, Voit & Osann
ATTORNEYS

United States Patent Office 3,112,406
Patented Nov. 26, 1963

3,112,406
GOVERNOR SYSTEM
Clarence L. Avery, Rockford, Ill., assignor to Woodward Governor Company, Rockford, Ill., a corporation of Illinois
Filed Dec. 15, 1960, Ser. No. 75,992
3 Claims. (Cl. 290—40)

This invention relates to speed control of prime mover-generator units employed for developing electrical power and concerns, more particularly, a governor system for providing such a unit with improved governed-system speed regulation.

Alternating current generators are conventionally provided with governor systems incorporating feedback from the prime mover throttle so as to produce a governor characteristic known as speed droop, in which throttle position is biased against the governor speed setting. Since throttle position thus directly affects speed regulation of the unit, regulation remains smooth and uniform only so long as throttle position movements uniformly reflect changes in energy delivered to the prime mover of the unit.

As a practical matter, such speed droop regulation is not uniform, particularly when a steam or jet impulse turbine is used as the generator prime mover. This is because incremental movements of turbine throttle valves through their full range of positions does not produce uniform changes in the energy supplied to the turbine. For example, as a needle in a water jet impulse turbine, or a steam chest poppet valve in a steam turbine, is about to close, a very slight movement of the servo controlling the valve produces a much larger change in energy supplied to the turbine than that same amount of movement when the valve is well open. Power changes per increment of throttle servo movement thus vary, depending on the range in which the unit is operating. As a result, obtaining speed regulation by biasing the throttle servo position against speed setting causes very sluggish performance in the ranges where slight servo movement produces proportionately smaller power changes.

This problem is aggravated with steam turbines controlled by sequentially-operated, multi-valve throttle units. With conventional speed droop, a whole series of sluggish response points are experienced throughout the full power range as each valve moves to the critical, almost open, position.

It is, therefore, the primary aim of the invention to provide a governor system for a turbine-generator unit affording constant speed regulation, rather than constant speed droop, so as to avoid irregularities in speed regulation. That is, in governor systems embodying the invention, the increment of power output change per increment of change in the governor speed setting remains constant through the full operating range of the unit.

With more particularity, it is an object of the invention to introduce a speed droop characteristic into a governor system that is independent of thottle servo movement.

In another aspect of the invention, it is an object to provide a governor system for a multiple jet impulse turbine which permits remote cutoff of one or more of the jets while the unit is carrying load and without serious fluctuations of frequency or output. It is a related object to provide such a remote cutoff which is very simple and trouble-free.

Other objects and advantages of the invention will become apparent upon reading the following detailed description and upon reference to the drawings in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
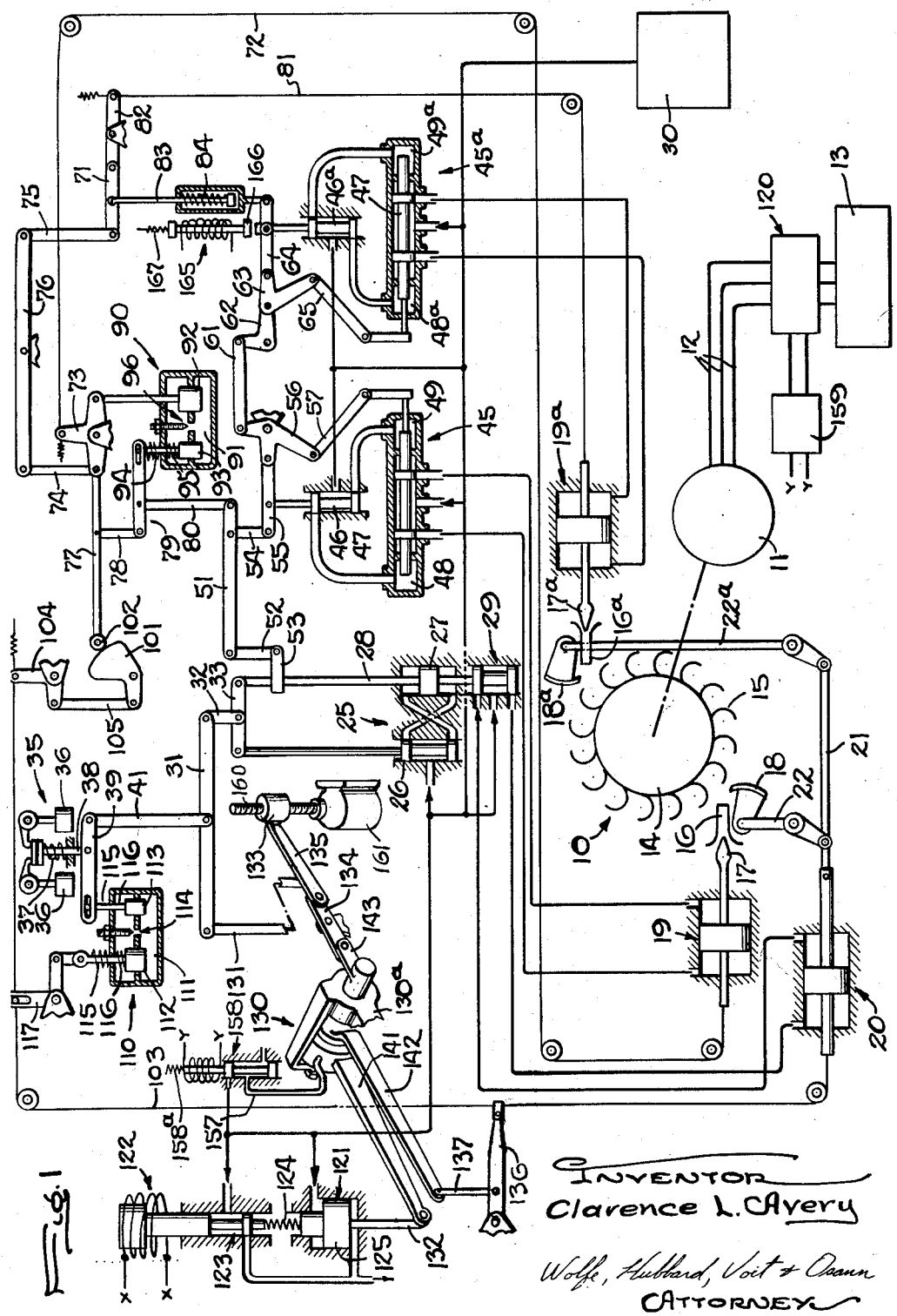
FIGURE 1 is a schematic diagram of a governor system embodying the invention.

Turning first to FIG. 1, there is diagrammed a speed controlling governor system embodying the invention and arranged to regulate a prime mover-generator unit which includes an impulse turbine 10 and an alternating current generator or alternator 11. The turbine 10 is drivingly coupled to the generator 11 and the power thus generated is connected through lines 12 to a load 13.

The turbine 10 is of the multiple jet type and includes a runner 14 carrying a plurality of buckets 15 which receive energy from streams of water directed against the buckets by a master jet 16 and a slave jet 16a. Only one slave jet 16a has been illustrated but, in practice, it will be appreciated that a plurality of such slave jets, each having the same relationship to the master jet 16, are normally included in a turbine of this type.

To function as a throttle for the turbine 10, the flow of the jets 16, 16a is controlled by needles 17 and 17a, respectively, and the direction and therefore effectiveness of the jets is controlled by deflectors 18 and 18a, respectively. The needles 17, 17a are positioned by master and slave throttle servos 19 and 19a respectively and the deflectors 18, 18a are positioned by a common throttle servo 20 through a link 21 which couples the servo 20 to both a shaft 22 on which the deflector 18 is mounted and a shaft 22a on which the deflector 18a is mounted.

For controlling the operation of the servo 20, and thus the positions of the deflectors 18, 18a, an actuator 25 is provided which includes a pilot valve having a plunger 26 controlling a servo piston 27 that drives a rod 28 to operate a relay valve plunger 29. When the pilot valve plunger 26 is lifted, fluid under pressure is directed from a pressure source or pump 30 to the underside of the piston 27 so that the rod 28 and thus the relay valve plunger 29 are also lifted. This directs fluid from the pump 30 to the right end of the servo 20 and causes the deflectors 18, 18a to be swung from the associated jets 16, 16a. Lowering of the pilot valve plunger 26 causes the deflectors to be swung into their associated jets.

The pilot valve plunger 26 is operated through a floating speed lever 31 that is coupled by a link 32 to a floating pilot valve lever 33 which carries the plunger. The pilot valve lever 33 extends between the plunger 26 and the servo piston rod 28 and thus serves to restore the plunger 26 to its neutral illustrated position following displacement of the lever 31 and the resulting repositioning of the servo piston 27.

For detecting variations in turbine speed and adjusting the position of the floating speed lever 31 in accordance with the variations detected, a governor 35 is provided which includes pivoted flyballs 36 that are rotatably driven by the turbine 10. Such driving connections are conventional and hence none is shown. As is also conventional, centrifugal force tending to swing the flyballs 36 outwardly is opposed by a compressed speeder spring 37 which urges a flyball rod 38 against the flyball mountings. The axial position of the flyball rod 38 is thus directly related to the speed of rotation of the turbine 10 and is transmitted to the floating speed lever 31 through a floating lever 39 and a link 41.

It can thus be seen that changes in the turbine speed of rotation result in axial movement of the flyball rod 38 and pivoting of the speed control lever 31 so that the pilot valve plunger 26 of the actuator 25 is operated. An increase in turbine speed further compresses the speeder spring 37, swinging the lever 31 clockwise and lowering the plunger 26. This causes the deflectors 18, 18a to be swung toward the jets 16, 16a. A decrease in turbine speed lifts the plunger 26 and swings the deflectors 18, 18a from their associated jets.

For controlling the master and slave throttle servos 19 and 19a, and thus the positions of the needles 17, 17a, master and slave actuators 45 and 45a are provided including respective pilot valves having plungers 46, 46a. The pilot valve plungers 46, 46a operate relay valves having plungers 47 and 47a by alternately actuating right and left servos 48, 48a and 49, 49a respectively. In the illustrated construction, the pilot valve plunger 46 is moved by the piston rod 28 of the actuator 25 through a floating lever 51. The floating lever 51 is coupled to the rod 28 by a link 52 and an arm 33, and is coupled to the plunger 46 through a link 54 and a floating lever 55. Upward movement of the piston rod 28 thus moves the pilot valve plunger 46 upwardly, and downward movement of the rod 28 results in downward movement of the plunger 46.

Upward movement of the pilot valve plunger 46 connects the pump 30 to the servo 48 so as to slide the relay valve plunger 47 to the right and thereby connect the pump 30 with the right hand side of the servo 19. This "opens the throttle" by withdrawing the needle 17 from the jet 16. Downward movement of the pilot valve plunger 46 actuates the servo 49 and causes the servo 19 to move the needle 17 into the jet 16.

To restore or "follow up" movement of the pilot valve plunger 46, the floating lever 55 is coupled to the relay valve plunger 47 through a bell crank 56 and a link 57. Thus, downward movement of the plunger 46, which results in movement of the plunger 47 to the left, causes the link 57 to rotate the bell crank 56 clockwise thereby restoring the plunger 46 to its illustrated equilibrium position.

For driving the master and slave needles 17, 17a in unison, a balancing connection is provided between the actuators 45, 45a. This connection includes a link 61 coupling the bell crank 56 to a bell crank 62 that carries a floating bell crank 63 which is pivoted to a floating lever 64 supporting the pilot valve plunger 46a. Upward movement of the floating lever 55 raises the pilot valve plunger 46 so as to not only cause withdrawal of the needle 17 from the jet 16 but also to rotate the bell crank 56 in a counterclockwise direction and thus restore the plunger 46 to its equilibrium position. Counterclockwise rotation of the bell crank 56 also rotates the bell crank 62 in a counterclockwise direction thereby raising the floating bell crank 63 and the floating lever 64 with the result that the pilot valve plunger 46a is lifted. This actuates the servo 49a so that fluid from the pump 30 is directed to the left hand side of the servo 19a with the result that the needle 17a moves in unison, and in the same direction with respect to the jets, as the needle 17. The pilot valve plunger 46a is restored to its equilibrium position upon movement of the relay valve plunger 47a through a link 65 which rotates the floating bell crank 63 to reposition the lever 64.

To proportion the motion of the needles 17, 17a so that the size of each of the jets 16, 16a remains approximately the same, the needle motions are fed back to the pilot valve floating levers 55, 64 through a connection which includes a floating lever 71. The motion of the needle 17 is transmitted through a cable 72 to a bell crank 73 which is coupled both to the floating lever 71, through links 74 and 75 and lever 76, and to the floating lever 55 through a floating lever 77, a link 78, a floating lever 79 and a link 80 which is coupled to the lever 51.

As noted above, the lever 51 connects with the lever 55 through the link 54.

The motion of the needle 17a is transmitted through a cable 81 to a lever 82 that is directly connected to the floating lever 71. A link 83, which is extensible against the bias of a compressed spring 84, couples the floating lever 71 with the pilot valve floating lever 64.

Through the connections just described, the motions of the needles 17 and 17a, transmitted through the cables 72 and 81, operate the respective pilot valve floating levers 55 and 64 so as to recenter the relay valve plungers 47, 47a and thus restore the levers 55 and 64 to their original equilibrium positions as occupied prior to resetting of the needles. The interposing of the floating lever 71 equalizes the motion of the needls 17 and 17a required to restore each of the floating levers 55, 64 and therefore insures that each needle is similarly positioned with respect to its associated jet irrespective of the speed at which the servos 19, 19a may drive the needles.

For preventing over-travel of the needles 17, 17a during a speed change correction, a stabilizing mechanism 90 is associated with the restoring connection for the floating lever 55. The mechanism 90 is of the well known type including a fluid chamber 91 closed by an input piston 92 and an output piston 93. The input piston 92 is connected to the bell crank 73 and the output piston 93 is connected to the floating lever 79 and is resiliently urged into an equilibrium position by a pair of opposed compressed springs 94 and 95. A needle valve 96 permits flow of fluid into and out of the chamber 91 at a controlled time rate. Thus, rotation of the bell crank 73 in response to movement of the needle 17 not only mechanically positions the floating lever 79 so as to restore the pilot valve floating lever 55 but also accentuates movement of the lever 79 through the mechanism 90, with the accentuated movement being gradually dissipated as the springs 94, 95 center the output plunger 93 during the time interval required for fluid to pass through the needle valve 96. The additional movement of the floating lever 79 imparted through the mechanism 90 creates a gradually dissipated drooping characteristic which prevents over-travel of the needle 17. Since the floating pilot valve lever 55 which controls the needle 17 is coupled to the pilot valve lever 64 which controls the needle 17a, the stabilizing effect of the mechanism 90 extends to both of the needle servos 19 and 19a.

In order to ultimately control the turbine 10 solely by the size of the jets 16, 16a, while bringing the deflectors 18, 18a into play only when rapid power changes of substantial magnitude are called for, the position of the deflectors is transmitted to the needle actuators 45, 45a through a connection including a cam 101 that cooperates with a cam follower 102 mounted on the floating lever 77. The positions of the deflectors 18 are transmitted to the pivoted cam 101 through a cable 103 which extends from the deflector servo 20 to a bell crank that is coupled through a link 105 to the cam 101. Rotation of the cam 101 is response to movement of the deflectors raises and lowers the floating lever 77 and thus affects the position of the pilot valve lever 55. The result of the connection thus described is that whenever the deflectors 18, 18a are moved from their normal position just beyond the jets 16, 16a, the cam 101 alters the position of the floating lever 77 so as to operate the needle actuators 45, 45a. The size of the jets 16, 16a is thus altered until the effect of the deflectors 18, 18a is no longer needed, whereupon the governor system returns the deflectors to their normal positions with the result that the cam 101 restores the lever 77 to its original equilibrium position.

To prevent hunting in the governor system, a compensating device 110 is provided to introduce temporary speed droop when the governor 35 calls for a speed level setting change. The device 110 is similar to the mechanism 90 and includes a fluid filled chamber 111 closed by an input piston 112 and an output piston 113. Fluid is passed to and from the chamber 111 at a timed rate controlled by a needle valve 114, and a pair of compressed springs 115 and 116 resiliently urge the output piston 113 into a centered, equilibrium position. The input plunger 112 is connected to a bell crank 117 that is rotated by the cable 103.

In operation, axial movement of the flyball rod 38 results in actuation of the servos 19, 19a and 20 so as to change the positions of the needles 17, 17a and the deflectors 18, 18a. Movement of the servo 20 is transmitted through the cable 103 and the bell crank 117 to the compensating device 110 with the result that the floating speed lever 31, displaced by movement of the flyball rod 38, is restored to its original position. This temporary speed droop introduced by the device 110 is dissipated as fluid leaks through the needle valve 114 at approximately the same time rate as the turbine 10 responds to the changed position of the deflectors 18, 18a and of the needles 17, 17a. Thus, the springs 115, 116 recenter the plunger 113 as the flyball rod 38 is shifted by the changing turbine speed with the result that the link 41 to the floating lever 31 is held steady and the speed level setting is changed without hunting.

The speed control governor system as so far described is similar to that shown in my U.S. Patent No. 2,898,925, issued August 11, 1959, and reference is made to that patent for a more detailed discussion of the operation of this system and its features and advantages.

In accordance with the present invention, the governor system of FIG. 1 provides constant speed regulation by biasing generator load against the governor speed level setting. That is, as the generator load increases, the speed level setting is decreased, and vice versa. Toward this end an electric power sensing device 120 is coupled to the lines 12 which transmit power from the generator 11 to the load 13, the output of the device 120 controls a servo 121 so that the servo is positioned in proportion to the generator load. In the preferred construction, the device 120 is electrically coupled to a solenoid 122 which urges a valve plunger 123 against the bias of a compressed spring 124. The spring 124 is anchored to a piston 125 forming the movable element of the servo 121.

In operation, an increase in load on the generator 11 causes an increase in the current supplied by the device 120 to the solenoid 122. This urges the valve plunger 123 downwardly against the bias of the spring 124 and admits fluid from the pump 30 to the underside of the servo piston 125. Upward movement of the servo piston 125 further compresses the spring 124 until the increased force exerted by the solenoid 122 is balanced and the valve plunger 123 is restored to its normal equilibrium position. A decrease in load on the generator 11 reduces the force exerted by the solenoid 122 so that the spring 124 elevates the valve plunger 123, dumping fluid from beneath the piston 123, with the result that the piston moves downwardly to relax the force exerted by the spring 124 and restore the valve plunger 123 to its equilibrium position. Thus, the linear position of the servo piston 125 is directly proportional to the load on the generator 11.

The position of the servo piston 125 is transmitted to the floating speed lever 31 through a transfer device 130 which, for present purposes, can be considered a rigid lever pivoted within a bracket 130a. The transfer device is pivoted to a rocking lever 134 that, in turn, is pivoted to a lever 135 which carries a link 131 coupled to the floating speed lever 31. Clockwise rotation of the transfer device 130 thus lifts the link 131 and counterclockwise movement of the device lowers the link 131.

The effect of the servo 121 on the speed level setting of the governor system can now be appreciated. For example, assume that the load 13 on the generator 11 increases a substantial amount so as to cause the speed of the turbine 10 to drop. The decrease in turbine speed allows the flyballs 36 to drop and permits the speeder spring 37 to lift the flyball rod 38 and thus lift and swing the floating speed lever 31 in a counterclockwise direction. This operates the pilot valve plunger 26 so as to swing the deflectors 18, 18a from the jets and withdraw the needles 17, 17a.

However, the increase in load also causes the solenoid 122 to shift the piston 125 upwardly, thereby rotating the transfer device 130 in a clockwise direction and, through the link 131, opposing the counterclockwise motion of the floating speed lever 31. Hence, the increase in power called for by the governor 35 is partially opposed by the repositioning of the servo 121. In effect therefore, the servo 121, positioned in proportion to the load on the generator, decreases the speed setting of the governor system as the load on the generator increases.

Conversely, a significant decrease in the load on the generator causing the turbine to speed up and the governor 35 to swing the floating speed lever 31 in a clockwise direction is opposed by the downward movement of the servo piston 125 resulting from the decrease in load. The servo 121, therefore, in effect, increases the speed setting of the governor system as the load on the generator 11 decreases.

Of course, when the generator 11 is tied into a synchronous system wherein the turbine 10 cannot affect the frequency of the system, i.e., an infinite bus, changes in the load 13 do not cause changes in the speed of the turbine. In such cases, turbine speed is fixed by the system frequency. However, an increase in the load 13 still causes the servo 121 to decrease the speed setting of the governor system by swinging the floating speed lever 31 in a clockwise direction and, conversely, a decrease in the load 13 causes the servo to increase the speed setting of the governor system. Thus, in a fixed frequency system, a change in the setting of the governor system effective to cause the generator to pick up additional load or drop part of the load being carried is opposed, to a slight degree, by the servo 121 and a speed droop characteristic is obtained.

It can now be seen that the speed regulation introduced by the position of the servo 121 in response to the load on the generator is completely independent of the positions of the throttle servos 19, 19a and 20. The regulation resulting from the speed droop characteristic imposed by the servo 121 thus remains constant through the full operating range of the turbine-generator unit.

So as to avoid loss of all regulation should there be a failure resulting in no load indicating signal being received at the solenoid 122 for positioning the servo 125, a conventional speed droop connection is provided together with means for bringing it into play when the position of the servo 121 no longer reflects the generator load. In the illustrated construction, the conventional speed droop connection includes a lever 136 clamped to the cable 103 and coupled to the transfer device 130 through a link 137. Again considering the transfer device 130 a rigid lever pivoted within the bracket 130a, it can be seen that withdrawal of the deflectors 18, 18a from the jets 16, 16a moves the cable 103 upwardly and lifts the lever 136 so as to rotate the transfer device in a clockwise direction. This tends to swing the floating speed lever 31 clockwise so as to decrease the speed setting of the governor system as the deflectors 18, 18a move to further open the throttle. Conversely, movement of the deflectors toward the jets 16, 16a to shut down the throttle lowers the lever 136 and thus tends to rotate the floating speed lever 31 counterclockwise to increase the speed setting of the governor system. A feedback connection of this type from the throttle servo to the speed setting element of the governor system constitutes conventional permanent speed droop, as will be appreciated by those skilled in the art.

As a feature of the invention, the transfer device 130 acts to clutch the servo 121 to the floating speed lever 31 when the load on the generator 11 is being sensed, and to clutch the lever 136 to the speed lever 31 when the generator load signal fails and the conventional speed droop connection is to take over. To this end, the transfer device 130 includes a pair of parallel arms 141 and 142 which are coupled to the rod 132 and the link 137 respectively. The arms 141, 142 are alternately clutched to a third arm 143 which forms that portion of the transfer device 130 pivoted to the lever 134 and thus connected to the link 131.

Figure 3:
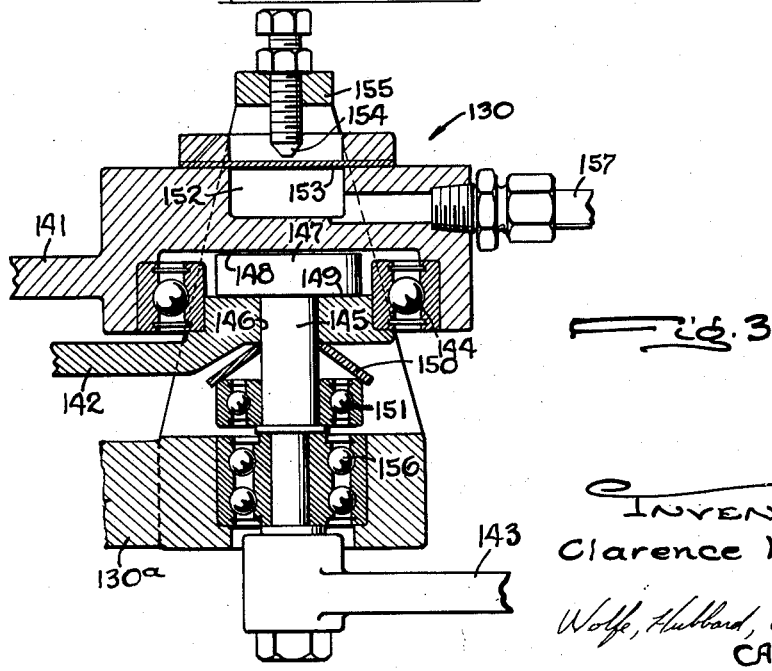
FIG. 3 is a fragmentary section showing the structure of one element forming a part of the embodiment shown in FIG. 1.

The arms 141, 142 are rotatably connected through a bearing 144 (see FIG. 3) and the arm 142 is rotatably mounted with respect to each of the arms 141, 142 through a shaft 145, rigid with the arm 143, which slidably fits through an aperture 146 formed in the arm 142 concentrically with the bearing 144. A clutch disk 147 is rigidly carried on the end of the shaft 145 between a circular clutch face 148 on the arm 141 and an annular clutch face 149 formed on the arm 142.

A stressed Belleville spring 150, sandwiched between the arm 142 and a bearing 151 anchored on the shaft 145, urges the clutch disk 147 into clutching engagement with the annular clutch face 149. To urge the clutch disk 147 from the face 149 and into clutching engagement with the face 148, a fluid actuator is provided including a chamber 152 enclosed by a flexible diaphragm 153. The diaphragm 153 underlies an adjustable abutment member 154 mounted in a yoke 155 forming part of the bracket 130a. The shaft 145, and thus the arms 141, 142 and 143, are journalled in the bracket 130a through a bearing 156.

When fluid under pressure is admitted to the chamber 152, the diaphragm 153 is expanded outwardly into engagement with the abutment 154 so as to urge the arm 141 downwardly (in FIG. 3) against the force of the spring 150 until the clutch disk 147 is moved into clutching engagement with the clutch face 148. Dumping hydraulic fluid from the chamber 152 relaxes the force of the diaphragm 153 against the abutment 154 and allows the stressed Belleville spring 150 to shift the clutch disk 147 from the face 148 into engagement with the opposite face 149.

In the illustrated embodiment, the chamber 152 is placed in communication, through a line 157, with a three-way solenoid valve 158 operated by a relay 159. So long as the power sensing device 120 is transmitting a control signal to the solenoid 122, the relay 159 energizes the solenoid valve 158 so as to couple the line 157 to the pump 30 and thereby keep the arm 141 clutched to the arm 143, with the result that the transfer device 130 acts as a rigid lever coupling the servo 121 and the floating speed lever 31. If no signal is generated by the device 120, the relay 159 drops out the solenoid valve 158 and a spring 158a shifts the valve to dump fluid from the chamber 152. With fluid pressure exhausted from the chamber 152, the Belleville spring 150 clutches the arm 142 to the arm 143 so that the transfer device 130 becomes a rigid lever connecting the lever 136 to the floating speed lever 31. In this way, turbine regulation is maintained even though there is a loss of signal from the device 120 reflecting the load being carried by the generator 11.

For selectively setting the speed level to be maintained by the governor system, the lever 135 is pivotally anchored to a nut 133 carried on a screw 160 that is rotatably coupled to a reversible electric motor 161. By energizing the motor 161 for rotation in one direction, the nut 133 is carried downwardly so as to lower the left end of the lever 135 and increase the speed setting of the governor. By energizing the motor 161 for rotation in the opposite direction, the speed level setting which the governor will maintain is decreased.

Since regulation of the turbine-generator unit is independent of throttle servo position, it is possible to shut off one of the jets of the multiple jet turbine 10 without serious fluctuation of generator output or frequency. As a feature of the invention, provision is made for cutting out the slave jet 16a and simultaneously adjusting the master jet 16 to maintain substantially constant the energy input to the turbine. For this purpose, a solenoid 165 having an actuator 166 held by a spring 167 is positioned above the valve plunger 46a of the slave actuator 45a. Energization of the solenoid 165 drives the actuator 166 downwardly against the bias of the spring 167 so as to shift the valve plunger 46a downwardly and thereby direct fluid under pressure to the servo 48a at the left end of the relay valve plunger 47a.

Downward movement of the valve plunger 46a, upon energization of the solenoid 165, is possible since the floating lever 64 which carries the valve plunger is supported at its right end by the resiliently extensible link 83 which readily permits clockwise swinging movement of the floating lever 64 upon overcoming the force exerted by the link spring 84.

Admitting fluid to the servo 48a drives the relay valve plunger 47a to the right so as to energize the throttle servo 19a for operation in the proper direction to close the jet 16a. As the jet 16a closes, the decrease in output is sensed by the device 120 and results in downward movement of the servo piston 125 and an increase in the speed setting of the governor system. The master needle 17 is thus drawn to the left so as to open the jet 16 and, in this way, keep the amount of energy supplied to the turbine 10 substantially constant.

It can thus be seen that since the regulation imposed by the servo 121 is entirely independent of the positions of the throttle servos 19, 19a and 20, cutting off the jet 16a and opening the jet 16 to compensate, has no effect on the constant speed regulation imposed on the system. Hence, the jet 16a can be cut off from a remote location by energizing the solenoid 165 while the turbine-generator unit is carrying load without serious fluctuations of frequency or output.

Figure 2:
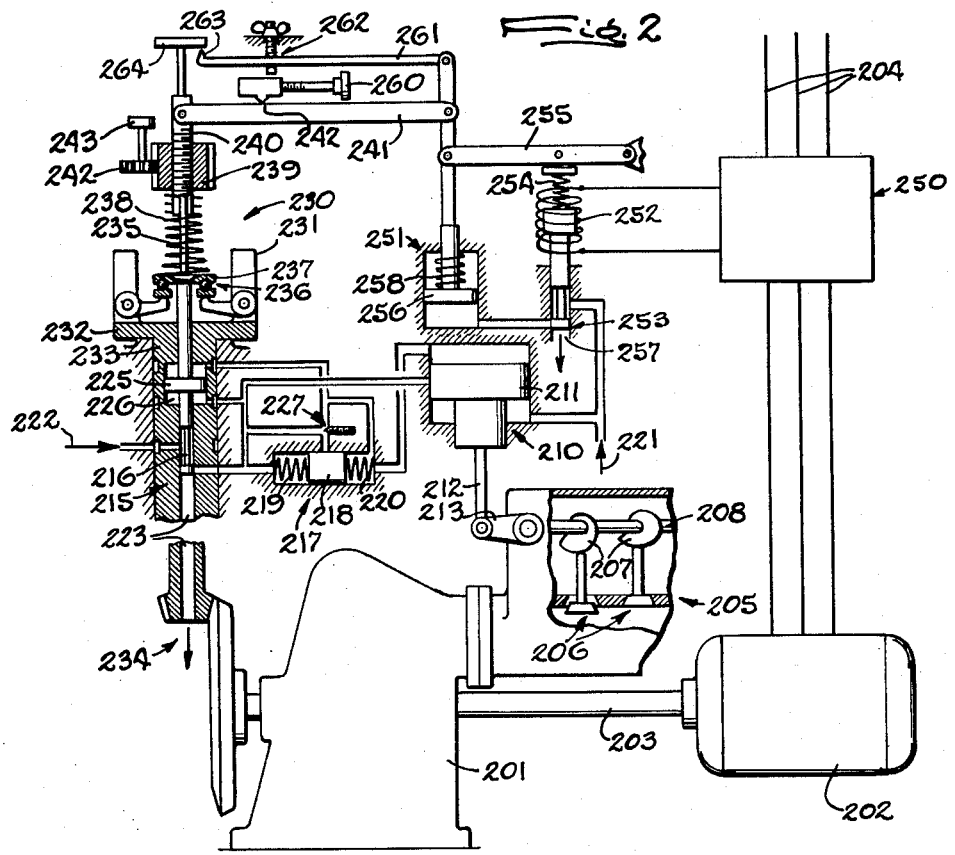
FIG. 2 is a schematic diagram of a different embodiment of the invention incorporated in a speed controlling governor system.

Considering next the embodiment shown in FIG. 2, in this figure is diagrammed a speed controlling governor system constructed in accordance with the invention and arranged to regulate a prime mover-generator unit which includes a steam turbine 201 and an alternator or alternating current generator 202. A shaft 203 drivingly couples the turbine 201 to the generator 202 so that the generator supplies power to a load on lines 204.

Driving energy is supplied to the turbine 201 in the form of steam from a steam chest 205 which contain a series of poppet valves 206 that function as a throttle for the turbine. Each of the valves 206 is operated by a cam 207, and the cams are secured to a shaft 208 in phased relationship so that rotation of the shaft 208 in a counterclockwise direction opens the valves 206 in succession, while rotation of the shaft 208 in a counterclockwise direction causes the cams 207 to successively close the valves 206. Although only two valves 206 are illustrated, it will be understood that in practice the steam chest 205 would contain a sufficient number of such valves to provide the desired degree of control over the turbine 201 through its full operating range.

For rotating the shaft 208 and thus controlling the turbine's throttle, a servo 210 is provided which includes a piston 211 connected through a rod 212 to a crank arm 213 that is secured to the shaft 208. In the illustrated construction, downward movement of the servo piston 211 rotates the shaft 208 in a counterclockwise direction so as to open the throttle and thus tend to increase the speed of the turbine. Upward movement of the piston 211 tends to decrease the speed of the turbine 201 by rotating the shaft 208 clockwise and closing, in succession, the poppet valves 206.

To position the servo 210 and thus determine the speed setting for the turbine 201, a pilot valve 215 having a plunger 216 is provided which controls the servo 210 through a compensating mechanism 217. The compensating mechanism 217 includes a movable wall in the form of a compensating piston 218 which is biased to a neutral position by opposed compressed springs 219 and 220. The servo piston 211 is balanced between fluid pressure from a source 221 exerted on the underside of the piston and fluid pressure from a source 222, directed through the pilot valve 215, acting on the top of the piston. The compensating piston 218 is interposed between the pilot valve 215 and the servo piston 211.

In operation, downward movement of the pilot valve plunger 216 admits fluid from the source 222 to the left hand side of the compensating piston 218 with the result that the piston is shifted to the right urging fluid against the top of the servo piston 211 and moving the servo piston downwardly. Conversely, upward movement of the pilot valve plunger 216 dumps fluid from the left of the compensating piston 218 through a passage 223, thereby allowing the piston 218 to shift to the left and relieve the pressure above the servo piston 211 so that it moves upwardly.

For detecting variations in turbine speed, and to shift the pilot valve plunger 216 in accordance with the variations detected, a governor 230 is provided having flyballs 231 pivotally supported on a platform 232 which is carried by a shaft 233. A bevel gear pair 234 directly couples the shaft 233 to the turbine drive shaft 203 so that the platform 232 rotates with the turbine drive shaft.

As is conventional, centrifugal force tends to swing the flyballs 231 outwardly and thus lift a flyball rod 235 secured to the pilot valve plunger 216. The flyballs 231 act on the rod 235 through a bearing 236 mounted on a flange 237 secured to the flyball rod. The centrifugal force developed by the spinning flyballs 231 is opposed by a speeder spring 238 which is compressed between the flange 237 and a nut 239. The nut 239 is carried on a threaded sleeve 240 that is held by a lever 241.

It can thus be seen that changes in the turbine speed of rotation results in axial movement of the flyball rod 235 and therefore in axial movement of the pilot valve plunger 216. An increase in turbine speed further compresses the speeder spring 238 so as to elevate the flyball rod 235 and lift the pilot valve plunger 216. This raises the servo piston 211 and rotates the shaft 208 in a direction to close the valves 206, thereby reducing the power supplied to the turbine 201. A decrease in turbine speed lowers the pilot valve plunger 216 and swings the shaft 208 in a counterclockwise direction to open the turbine throttle poppet valves 206.

For effecting compensation in the form of temporary speed droop, the pressure differential resulting from linearly shifting the compensating piston 218 is used to maintain a gradually dissipated restoring force on the pilot valve plunger 216. In the illustrated construction, the pilot valve plunger 216 carries a servo piston 225 which reciprocates in a chamber 226. The left hand side of the compensating piston 218 is in communication with the chamber 226 below the piston 225, and the right hand side of the piston 218 is in communication with the chamber 226 above the piston 225. The lines connecting the respective ends of the piston 215 with the upper and lower portions of the chamber 226 are bridged by a needle valve 227 which permits leakage, at a controlled time rate, between the opposite ends of the piston 218 and the upper and lower portions of the chamber 226.

In operation, when a speed level setting change is called for and the pilot valve plunger 216 moves downwardly under the urging of the speeder spring 238 to admit fluid from the source 222 against the left side of the compensating piston 218, fluid is also directed to the lower portion of the chamber 226 so that a restoring force is exerted on the piston 225 opposing the speeder spring and returning the valve plunger to its neutral position. The movement of the compensating piston 218 to the right as a result of the surge of fluid from the source 222 compresses the spring 220, and this spring, acting through the piston 218, maintains the restoring hydraulic force on the underside of the piston 225. The restoring force is gradually dissipated by fluid leakage, at a controlled time rate, through the needle valve 227 as the piston 218 is gradually returned to its centered equilibrium position. Conversely, it can be seen that upward movement of the valve plunger 216, which results in shifting of the compensating piston 218 to the left, compresses the spring 219 so that this spring maintains a restoring force acting downwardly on the piston 215 until the piston 218 is again centered as a result of fluid leakage through the needle valve 227.

The temporary speed droop introduced by the compensating mechanism 217 is dissipated at approximately the same rate as the turbine responds to a change in speed level setting and hence the governor system effects a turbine speed connection smoothly and directly, without hunting.

In order to manually set the governor system operation at a selected speed level, a gear 242 is meshed with gear teeth on the periphery of the nut 239 and a thumb screw 243 is provided for rotating the gear 242. By rotating the thumb screw 243, the nut 239 can be run up and down on the threaded sleeve 240 so as to vary the compression of, and thus the force exerted by, the speeder spring 238. By rotating the nut 239 downwardly, the speed level setting of the governor is increased and, conversely, relaxing the force exerted by the speeder spring 238 by rotating the nut 239 upwardly decreases the speed level setting of the governor.

The speed control governor system so far described, and particularly the compensating mechanism 217, is quite similar to that shown in U.S. Patent No. 2,478,753, issued August 9, 1949, and reference is made to that patent for a more detailed discussion of the operation of this disclosed arrangement and its features and advantages.

In accordance with the invention, the load on the generator 202 is biased against the speed level setting of the governor system so that as the governor load increases, the speed level setting is decreased, and vice versa. Toward this end, an electric power sensing device 250 is coupled to the power transmitting line 204 so as to sense the load being carried by the generator 202. The output of the device 250 controls a servo 251 so that the servo is positioned in proportion to the generator load. In the preferred construction, the device 250 is electrically coupled to a solenoid 252 which urges a valve plunger 253 against the bias of a compressed spring 254. The spring 254 is anchored, through a lever 255, to a piston 256 which forms the movable element of the servo 251.

In operation, an increase in load on the generator 202 causes an increase in the current supplied by the device 250 to the solenoid 252. This urges the valve plunger 253 upwardly against the bias of the spring 254 and dumps fluid through a passage 257 from the underside of the servo piston 256. The piston 256 thus moves downwardly under the urging of a compressed spring 258 and, in so doing, rotates the lever 255 in a counterclockwise direction so as to further compress the spring 254. Movement of the piston 256 continues until the increased compression in the spring 254 balances the increased force exerted by the solenoid 252 and the valve plunger 253 is restored to its normal equilibrium position.

A decrease in load on the generator 202 reduces the force exerted by the solenoid 253 so that the spring 254 lowers the valve plunger 253 with the result that fluid is directed from the source 221 to the underside of the piston 256. As a result, the servo piston 256 moves upwardly against the force of the spring 258 and swings the lever 255 in a clockwise direction, relaxing the force exerted by the spring 254 and restoring the valve plunger 253 to its equilibrium position. It can thus be seen that the linear position of the servo piston 256 is directly proportional to the load on the generator 202.

The position of the servo piston 256 is transmitted to the governor 230 by being coupled to the right hand end of the lever 241. The lever 241 pivots about a fulcrum point 242 so that upward movement of the servo piston 256 lowers the threaded sleeve 240, and thus the nut 239, and thereby further compresses the speeder spring 238. Downward movement of the servo piston 256 elevates the nut 239 and relaxes the pressure exerted by the speeder spring 238.

The effect of the servo 251 on the speed level setting of the governor system can now be appreciated. For example, assume that the load on the generator 202 increases a substantial amount so as to cause the speed of the turbine 201 to drop. The decrease in turbine speed allows the flyballs 231 to swing upwardly under the urging of the speeder spring 238, thereby lowering the pilot valve plunger 216 and driving the throttle servo 210 in a direction to open the poppet valves 206.

However, the increase in load also causes the solenoid 252 to lower the piston 256 so as to swing the lever 241 in a clockwise direction and relax the force exerted by the speeder spring 238. Hence, the increase in power called for by the governor 230 is lessened by the repositioning of the lever 241. In effect, therefore, the servo 251, positioned in proportion to the load on the generator, decreases the speed setting of the governor system as the load on the generator increases.

Conversely, a significant decrease in the load on the generator causing the turbine to speed up and the governor 230 to lift the valve plunger 216 and close the poppet valves 206, is opposed by upward movement of the servo piston 256 which increases the force exerted by the speeder spring 238 on the flyballs 231. The servo 251, therefore, in effect, increases the speed setting of the governor system as the load on the generator 202 decreases.

Just as in the embodiment disclosed in FIG. 1, it can now be seen that the speed regulation introduced by the servo 251 into the governor system shown in FIG. 2 is responsive solely to the load on the generator 202 and is completely independent of the position of the throttle servo 210. The regulation resulting from the speed droop characteristic imposed by the servo 251 thus remains constant through the full operating range of the turbine generator unit. This is of particular significance in the FIG. 2 embodiment since it avoids the series of sluggish response points experienced with conventional speed droop feedback as each of the poppet valves 206 moves to the critical, almost open, position.

As a further feature of the embodiment shown in FIG. 2, the amount of droop introduced by the servo 251 can be adjusted by rotating a thumb screw 260 which shifts the fulcrum point 242 for the lever 241. In this way, the extent of the effect on the speeder spring 258 resulting from repositioning the servo 251 can be varied.

If desired, a load limit can be imposed on the governor system shown in FIG. 2 by coupling a lever 261 to the servo piston 256. The lever 261 is pivoted about an adjustable fulcrum point 262 and has one end 263 underlying a flange 264 secured to the flyball rod 235. It can thus be seen that the lever end 263 prevents the flyball rod 235 from dropping downwardly more than a predetermined amount at each load level carried by the generator 202. In this way, the servo 210 is prevented from opening the turbine throttle beyond a point determined by the setting of the adjustable fulcrum 262.

I claim as my invention:

1. For regulating the power output of a prime mover-generator unit, the combination comprising, a first servo for operating the throttle of said prime mover, an actuator for controlling the operation of said servo, a governor for detecting variations in prime mover speed from a predetermined value and being coupled to said actuator for making throttle servo position responsive to prime mover speed, said governor being adjustable to vary said predetermined value from which throttle servo position is responsive, a power-sensing device for measuring the load on said generator, a second servo positioned by said device proportionately to the generator load, a first selectively clutched connection coupling said second servo and said adjustable governor which, when clutched, decreases said predetermined value as said second servo is moved in response to increasing generator load and increases said value as said servo is moved in response to decreases in load, a second selectively clutched connection coupling said first servo and said adjustable governor which, when clutched, decreases said predetermined value as said first servo is moved to open said throttle and increases said value as said servo is moved to close said throttle, and means controlled by said device for clutching said first connection and declutching said second connection so long as said device positions said second servo above a minimum load indicating position, said means being effective to declutch said first connection and clutch said second connection whenever said device does not position said second servo above said minimum load indicating position.

2. For regulating the power output of a prime mover-generator unit, the combination comprising, master and slave servos for operating respective master and slave throttles supplying power to said prime mover, master and slave actuators for controlling said master and slave servos respectively, a governor for detecting variations in prime mover speed from a predetermined value and being coupled to said master actuator for making master throttle servo position responsive to prime mover speed, a balancing connection coupling said master and slave servos so that movement of the former causes proportionate movement of the latter whereby each throttle is similarly adjusted by said governor, an operator for selectively moving said slave actuator so as to shut off said slave throttle, said balancing connection being effective to move said master actuator so as to open said master throttle as said operator shuts off said slave throttle, said governor being adjustable to varying said predetermined value from which throttle servo position is responsive, a power sensing device for measuring the load on said generator, a third servo positioned by said device proportionately to the generator load, and a connection coupling said third servo and said adjustable governor for decreasing said predetermined value as said third servo is moved in response to increases in generator load and increasing said value as said servo is moved in response to decreases in generator load.

3. For regulating the power output of a prime mover-generator unit, the combination comprising, master and slave servos for operating respective master and slave throttles supplying power to said prime mover, master and slave actuators for controlling said master and slave servos respectively, a governor for detecting variations in prime mover speed from a predetermined value and being coupled to said master actuator for making master throttle servo position responsive to prime mover speed, a balancing connection coupling said master and slave servos so that movement of the former causes proportionate movement of the latter whereby each throttle is similarly adjusted by said governor, an operator for selectively moving said slave actuator so as to shut off said slave throttle, and said balancing connection being effective to move said master actuator so as to open said master throttle as said operator shuts off said slave throttle.

References Cited in the file of this patent

UNITED STATES PATENTS 1,110,799    Kramer _____ Sept. 15, 1914